UNITED STATES PATENT OFFICE.

WALDEMAR ASEF, OF PHILADELPHIA, PENNSYLVANIA.

PROCESS OF MAKING PURE ZINC OXID.

1,165,743.  Specification of Letters Patent.  Patented Dec. 28, 1915.

No Drawing.  Application filed October 26, 1914.  Serial No. 868,555.

*To all whom it may concern:*

Be it known that I, WALDEMAR ASEF, a subject of the Emperor of Russia, residing in the city of Philadelphia, in the county of Philadelphia and State of Pennsylvania, have invented a certain new and useful Process of Making Pure Zinc Oxid, of which the following is a specification.

The principal object of the present invention is to provide not only for obtaining pure zinc oxid but also for decomposing the salt or salts employed for that purpose, thus making a valuable product, and at the same time conserving the caustic alkali for reuse.

According to my invention a zincate solution is decomposed by the addition of a salt or salts, thereby precipitating pure zinc oxid and forming a caustic alkali solution in which the salt or salts are inert, and decomposing the salt or salts in an appropriate manner or by an appropriate agent inactive in respect to the caustic alkali solution to form a valuable product also inert in the caustic alkali solution.

For the sake of further explanation reference may be made to an illustrative example of the practice of the invention in a case in which its advantages are obvious, and in this connection it will be assumed that the zincate solution was decomposed by the addition of a solution of sodium carbonate, thus precipitating pure zinc oxid and leaving after filtration a mother liquor consisting of sodium hydrate and sodium carbonate.

By the present invention, and as a part of the process, the sodium carbonate is to be decomposed so as to yield a valuable product but without destroying the caustic alkali solution which is kept for reuse. This can be done by the addition of lime to the mother liquor. The result is the formation of calcium carbonate, which is inert in the liquor, and the formation of sodium hydrate which adds itself to the caustic alkali solution. To express this otherwise the mother liquor, after the recovery of the pure zinc oxid consists of NaOH, Na$_2$CO$_3$ and the addition of lime causes the following reaction in the mother liquor:

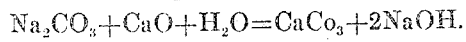

$$Na_2CO_3 + CaO + H_2O = CaCo_3 + 2NaOH.$$

The sodium hydrate formed in the reaction of course adds itself to the sodium hydrate present in the mother liquor prior to the addition of the lime, and the caustic alkali can be reused in making zincate solution and for other purposes. The sodium carbonate is converted into the valuable product caustic soda and calcium carbonate is inert and can be readily removed as by filtration. Of course caustic potash can be used instead, and is the equivalent of caustic soda.

In the practice of the invention the origin of the zincate solution is not important. It may be made by dissolving impure zinc oxid material or metallic zinc in a caustic alkali solution. If the zinc is present in the original material as sulfid or carbonate, it may preliminarily be converted into impure oxid as by roasting. The impure zinc oxid may be obtained from so-called "waste liquors" of the wet copper extraction process and in this case the calcium carbonate formed in the above described reaction can be used for precipitating zinc content from the waste liquor. The zinc or zinc oxid material is dissolved, hot or cold, in a concentrated solution of caustic alkali. One example of a concentrated solution of caustic alkali is about 600 grams per liter. As a result, the zinc goes into solution as zincate. Pure zinc oxid is precipitated by the addition of a salt or salts inert in the caustic alkali solution, of which salt or salts a solution of sodium carbonate is an example, and the mother liquor is filtered off. The mother liquor is then subjected to treatment by which its caustic alkali is not affected but by which the added salt or salts are decomposed to produce a valuable substance or substances inert in respect to the caustic alkali solution. An example of this step is the addition of lime, as has been described, which results in the formation of caustic alkali, a valuable product, and calcium carbonate, and these are inert in respect to the caustic alkali solution in which they are formed. The caustic alkali solution can be filtered off from the calcium carbonate and if desired evaporated for use. By analysis the zinc product is zinc oxid.

It will be obvious to those skilled in the art that modifications may be made in the practice of the herein described process, but

Having thus described the invention, what I claim is:

1. The process of making pure zinc oxid and recovering the caustic alkali solution and obtaining a valuable product or products, which consists in decomposing a zincate solution by the addition of a solution of a salt, inert in caustic alkali solution substantially as described, thereby precipitating pure zinc oxid and forming a caustic alkali solution in which said salt is inert, separating the pure zinc oxid from the mother liquor, subjecting the mother liquor to treatment inert in respect to the caustic alkali and adapted to decompose the salt and form a product or products, and recovering the caustic alkali and product or products.

2. The process of obtaining pure zinc oxid and recovering the caustic soda solution and making more caustic soda and corbonate of calcium, which consists in decomposing a zincate solution by the addition of a solution of sodium carbonate thereby precipitating pure zinc oxid and forming a caustic soda solution in which carbonate of calcium is inert, separating pure zinc oxid from the mother liquor, treating the mother liquor with lime which decomposes the sodium carbonate forming caustic soda and calcium carbonate, and separating the calcium carbonate to recover caustic soda.

In testimony whereof I have hereunto signed my name.

WALDEMAR ASEF.

Witnesses:
CLIFFORD K. CASSEL,
FRANK E. FRENCH.